United States Patent
Hendrix et al.

(10) Patent No.: US 11,121,459 B2
(45) Date of Patent: Sep. 14, 2021

(54) IOT GATEWAY/CELLULAR BASE STATION ASSEMBLIES

(71) Applicant: CommScope Technologies LLC, Hickory, NC (US)

(72) Inventors: Walter Mark Hendrix, Richardson, TX (US); Willis Frank James, Wylie, TX (US); Mark George Spaulding, Wylie, TX (US); Wayne Hopkinson, Hickory, NC (US); Jeffrey Cook, Allen, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/737,458

(22) Filed: Jan. 8, 2020

(65) Prior Publication Data

US 2020/0227817 A1 Jul. 16, 2020

Related U.S. Application Data (60) Provisional application No. 62/790,645, filed on Jan. 10, 2019.

(51) Int. Cl.
| | |
|---|---|
| *H01Q 1/44* | (2006.01) |
| *H01Q 1/22* | (2006.01) |
| *H01Q 9/30* | (2006.01) |
| *H01Q 1/24* | (2006.01) |
| *H04W 4/38* | (2018.01) |
| *H04W 4/70* | (2018.01) |
| *H04W 88/16* | (2009.01) |
| *H04W 88/08* | (2009.01) |

(52) U.S. Cl.
CPC ............. *H01Q 1/44* (2013.01); *H01Q 1/2291* (2013.01); *H01Q 9/30* (2013.01); *H04W 4/38* (2018.02); *H04W 4/70* (2018.02); *H04W 88/08* (2013.01); *H04W 88/16* (2013.01)

(58) Field of Classification Search
CPC .......... H01Q 1/44; H01Q 1/2291; H01Q 9/30; H04W 4/38; H04W 4/70; H04W 88/08; H04W 88/16
USPC ..................................................... 455/562.1
See application file for complete search history.

(56) References Cited

U.S. PATENT DOCUMENTS

| | | | |
|---|---|---|---|
| 10,581,972 B1 * | 3/2020 | GokulRaju | ........... H04M 15/51 |
| 2010/0142427 A1 * | 6/2010 | Ramsey | ............... H01Q 1/1235 |
| | | | 370/311 |
| 2012/0154239 A1 * | 6/2012 | Bar-Sade | ................. H01Q 3/06 |
| | | | 343/839 |
| 2017/0122546 A1 * | 5/2017 | Abbott | .................... F21V 33/00 |
| 2018/0062729 A1 | 3/2018 | Linehan et al. | |
| 2018/0254545 A1 | 9/2018 | Hendrix et al. | |

(Continued)

FOREIGN PATENT DOCUMENTS

| | | | |
|---|---|---|---|
| CN | 207744081 U | * | 8/2018 |
| CN | 108548150 A | * | 9/2018 |
| CN | 207939802 U | * | 10/2018 |

*Primary Examiner* — Mohammed Rachedine
(74) *Attorney, Agent, or Firm* — Myers Bigel, P.A.

(57) ABSTRACT

An assembly includes: a small cell antenna base station comprising a radio, an antenna, and a mounting structure; and an IoT gateway assembly mounted to the mounting structure, the IoT gateway assembly comprising: an IoT gateway module configured for aggregation and backhaul of data from IoT sensors; and an IoT antenna connected with the IoT gateway module.

6 Claims, 7 Drawing Sheets

(56) References Cited

U.S. PATENT DOCUMENTS

2019/0150306 A1    5/2019   Hendrix et al.
2019/0226672 A1*   7/2019   Abbott ................. H01Q 21/205
2019/0327845 A1   10/2019   Spaulding
2020/0084831 A1*   3/2020   Urban ................... G08G 1/093

* cited by examiner

FIG. 17

IOT GATEWAY/CELLULAR BASE STATION ASSEMBLIES

RELATED APPLICATION

The present application claims priority from and the benefit of U.S. Provisional Patent Application No. 62/790,645, filed Jan. 10, 2020, the disclosure of which is hereby incorporated herein in its entirety.

TECHNICAL FIELD

The preset disclosure relates generally to electronic equipment, and more specifically to the deployment of electronic equipment.

BACKGROUND

A current trend is for electronic devices to have increased sensing and communications connectivity, along with an increased ability to monitor their own status and communicate that status to remote devices. For example, the nascent Internet-of-Things ("IoT") movement envisions providing a wide variety of electronic devices and other objects (e.g., clothing, accessories, etc.) with sensors, processing capabilities and low power wireless transceivers. This hardware allows these devices/objects to broadcast information such as status, location, health, environmental and/or other information to an external communications network such as, for example, a low power wide access IoT communications network such as the low power networks provided by Sigfox® or LoRa® or the recently standardized narrowband Internet-of-Things (NB-IoT). As an example, an electronic device such as an appliance may have internal sensors that monitor the health of appliance's internal electronics and upon detecting a potential issue may transmit a few ultra-low power bytes of information to notify a user or other entity that a potential problem has been detected. The functionality of electronic devices that are installed in various electronic equipment cabinets may similarly be enhanced with access to a wireless data network, which may allow these devices to, for example, intermittently transmit status information, alarms and/or sensor data to remote locations. This may reduce maintenance requirements, outages due to equipment failure and/or equipment redundancy requirements as the electronic devices themselves may request maintenance or replacement prior to failure.

It is anticipated that literally billions of IoT sensors will be deployed over the next few years. IoT Gateways, which serve as connection points between the "cloud" and controllers, sensors and the like, can provide a method for aggregation and backhaul of data from IoT sensors. A significant percentage of these Gateway units (approximately 30-40 percent) may be outdoor units, and as such will likely need to be "ruggedized" to withstand environmental conditions such as wind, moisture, and dirt, and may also need to prevent against potential theft and vandalism.

SUMMARY

As a first aspect, embodiments of the invention are directed to an assembly comprising: a small cell antenna base station comprising a radio, an antenna, and a mounting structure; and an IoT gateway assembly mounted to the mounting structure. The IoT gateway assembly comprises an IoT gateway module configured for aggregation and backhaul of data from IoT sensors and an IoT antenna connected with the IoT gateway module.

As a second aspect, embodiments of the invention are directed to an assembly comprising: a small cell antenna base station comprising a radio, an antenna, and a monopole, wherein the antenna is mounted on, an upper end portion of the monopole; and, an IoT gateway assembly mounted to the monopole. The IoT gateway assembly comprises: an IoT gateway module configured for aggregation and backhaul of data from IoT sensors; and an IoT antenna connected with the IoT gateway module.

As a third aspect, embodiments of the invention are directed to an assembly comprising: a small cell antenna base station comprising a radio, an antenna, and an electronics cabinet; and an IoT gateway assembly mounted to the electronics cabinet. The IoT gateway assembly comprises: an IoT gateway module configured for aggregation and backhaul of data from IoT sensors, the IoT gateway mounted being mounted within the electronics cabinet; and an IoT antenna connected with the IoT gateway module.

DETAILED DESCRIPTION

Aspects of the present disclosure are described below with reference to the accompanying drawings. The present disclosure is not limited to the illustrated embodiments; rather, these embodiments are intended to fully and completely convey to those skilled in this art how to make and use the teachings of the present disclosure. In the drawings, like numbers refer to like elements throughout, Thicknesses and dimensions of some elements may not be to scale.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of devices described herein in use or operation in addition to the orientation depicted in the figures. For example, if a device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

It will be understood that, although the terms first, second, etc, may be used herein to describe various elements, these elements should not be limited by these terms. These terms are only used to distinguish one element from another. For example, a first element could be termed a second element, and, similarly, a second element could be termed a first element, without departing from the scope of the present disclosure.

Referring now to the drawings, a small cell antenna 20 mounted on a street light pole 10 is shown in FIGS. 1-5. An exemplary street light pole 10 and antenna 20 (which, along with accompanying equipment such as a radio, comprise a small cell antenna base station 5) are described in detail in U.S. Patent Publication No. 2018/0254545 to Hendrix et al., the disclosure of which is hereby incorporated herein by reference in its entirety. Those skilled in this art will appreciate that other mounting structures, such as conventional monopoles, may also be employed.

Figure 3:
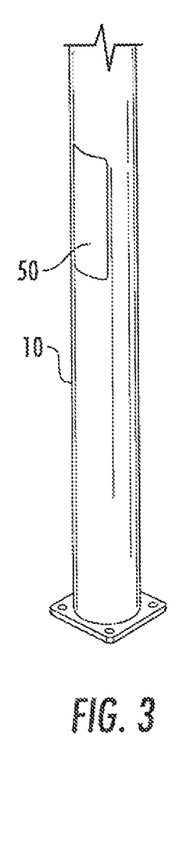
FIG. 3 is an enlarged partial perspective view of the street pole and IoT Gateway assembly of FIG. 1 with the cover in place.
Figure 4:
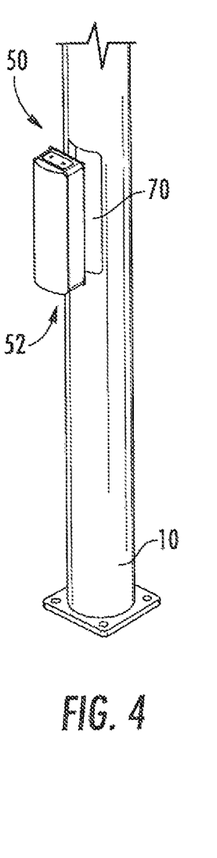
FIG. 4 is an enlarged exploded partial perspective view of the street pole and IoT Gateway assembly of FIG. 1.
Figure 5:
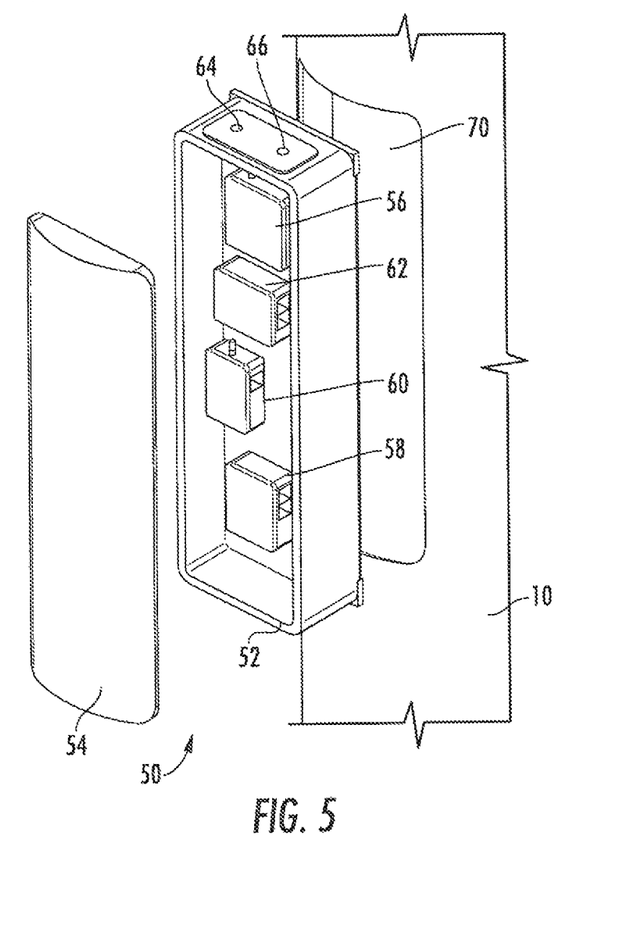
FIG. 5 is a greatly enlarged exploded partial perspective view of the loT Gateway assembly and street pole of FIG. 1.
Figure 6:
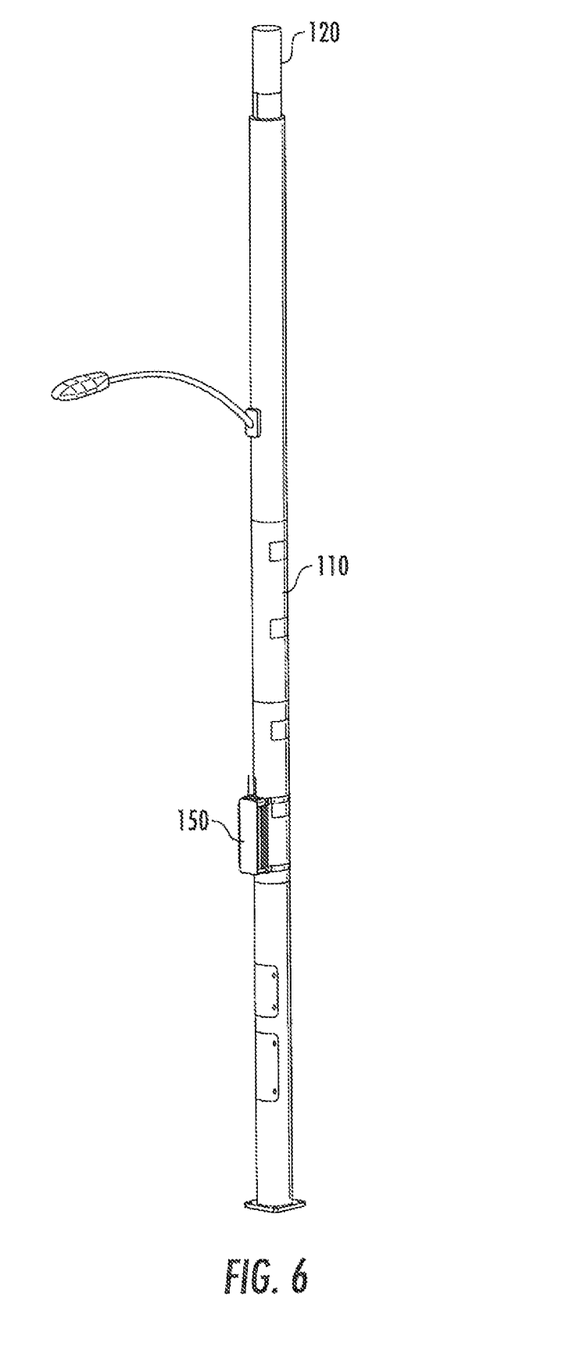
FIG. 6 is a schematic perspective view of a street pole and small cell antenna with an IoT Gateway assembly mounted to the exterior of the street pole according to alternative embodiments of the invention.
Figure 7:
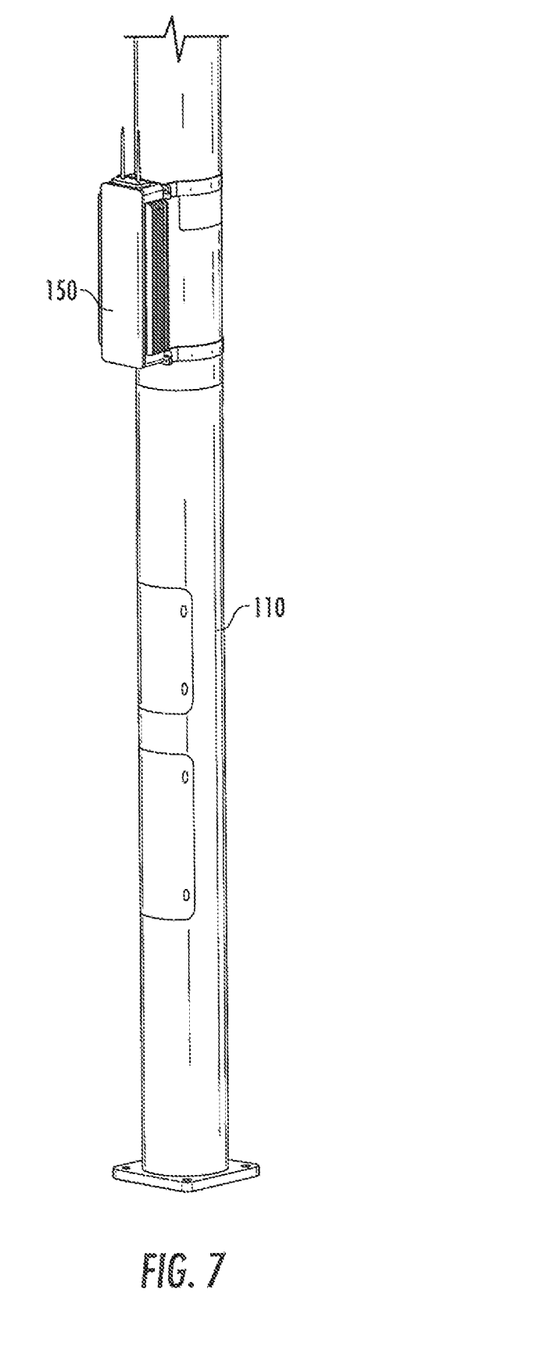
FIG. 7 is an enlarged partial perspective view of the street pole and IoT Gateway assembly of FIG. 6.
Figure 8:
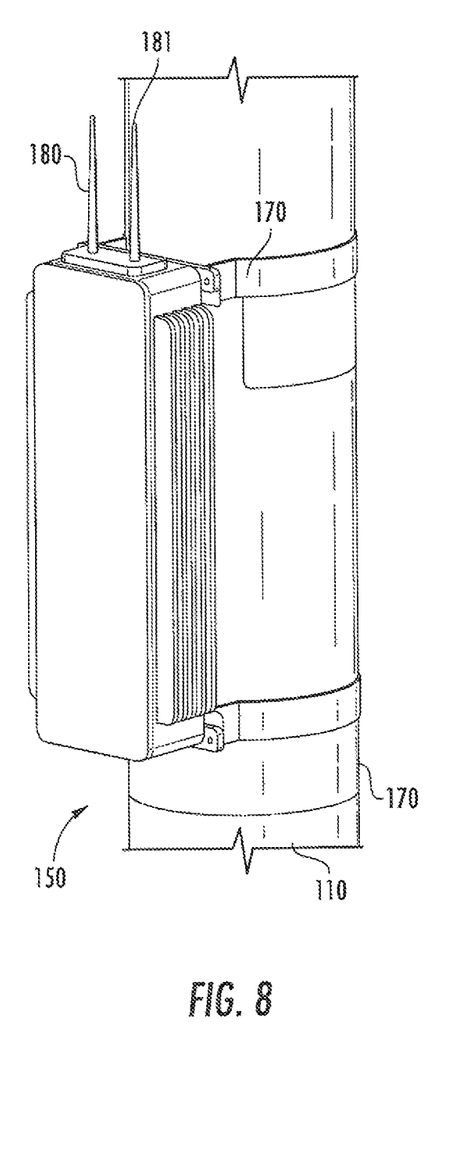
FIG. 8 is a greatly enlarged partial perspective view of the IoT Gateway assembly and street pole of FIG. 6.
Figure 9:
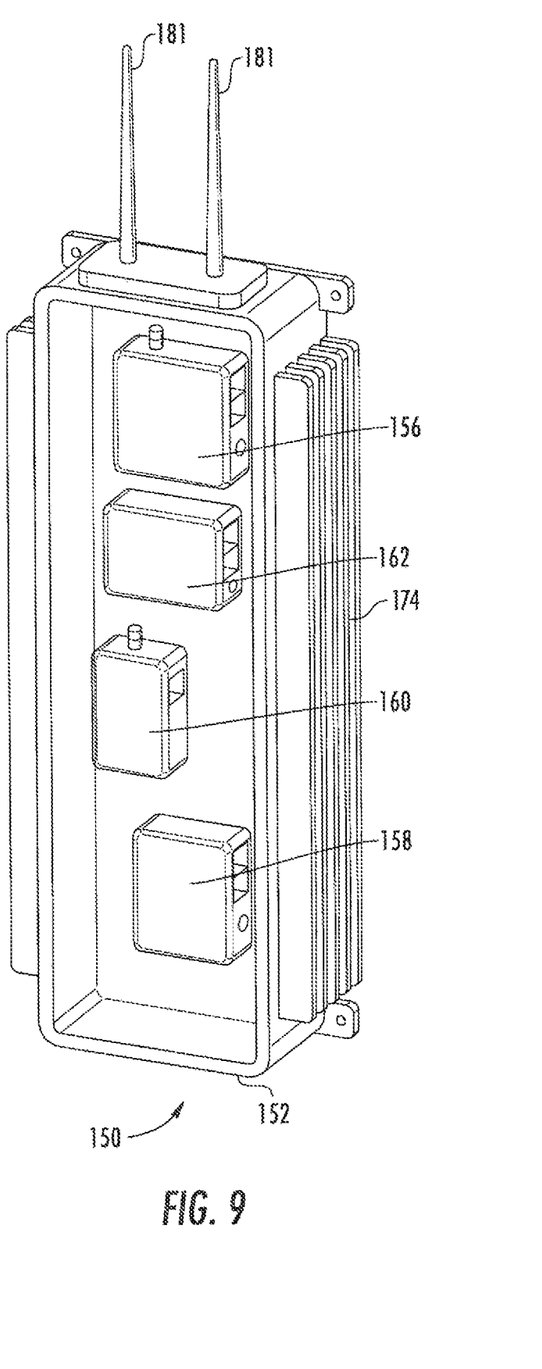
FIG. 9 is an enlarged perspective view of the IoT Gateway of FIG. 6 with its cover removed.

As can be seen in FIGS. 3-5, the pole 10 includes mounted therein an IoT Gateway module assembly 50. The assembly 50 includes an enclosure 52 with a cover 54. As shown in FIGS. 3 and 4, the enclosure 52 may be mounted in a cavity 70 in the pole 10, with the cover 54 contoured to match the exterior surface of the pole 10. Inside the enclosure 52 are mounted an IoT Gateway module 56 and an optical-to-electrical and electrical-to-optical ("O/E") backhaul module 58. In the illustrated embodiment, the assembly 50 also includes an optional WiFi module 60 and an optional edge compute CPU module 62. On its upper surface, the enclosure 52 has an IoT outlet 64 and a WiFi outlet 66.

Power and optical connections to the components in the assembly 50 can be achieved in a number of different ways. For example, the pole 10 may include blind mate connectors that enables the IoT Gateway assembly 50 to simply be mounted thereon in a "plug and play" fashion. Alternatively, a dangle cable suspended from the inside of the pole 10 may be used to connect to the assembly 50, As another alternative, an inductive charging pad may be employed to automatically power the assembly 50 when it is mounted. Other possibilities will be apparent to those of skill in this art.

Figure 1:
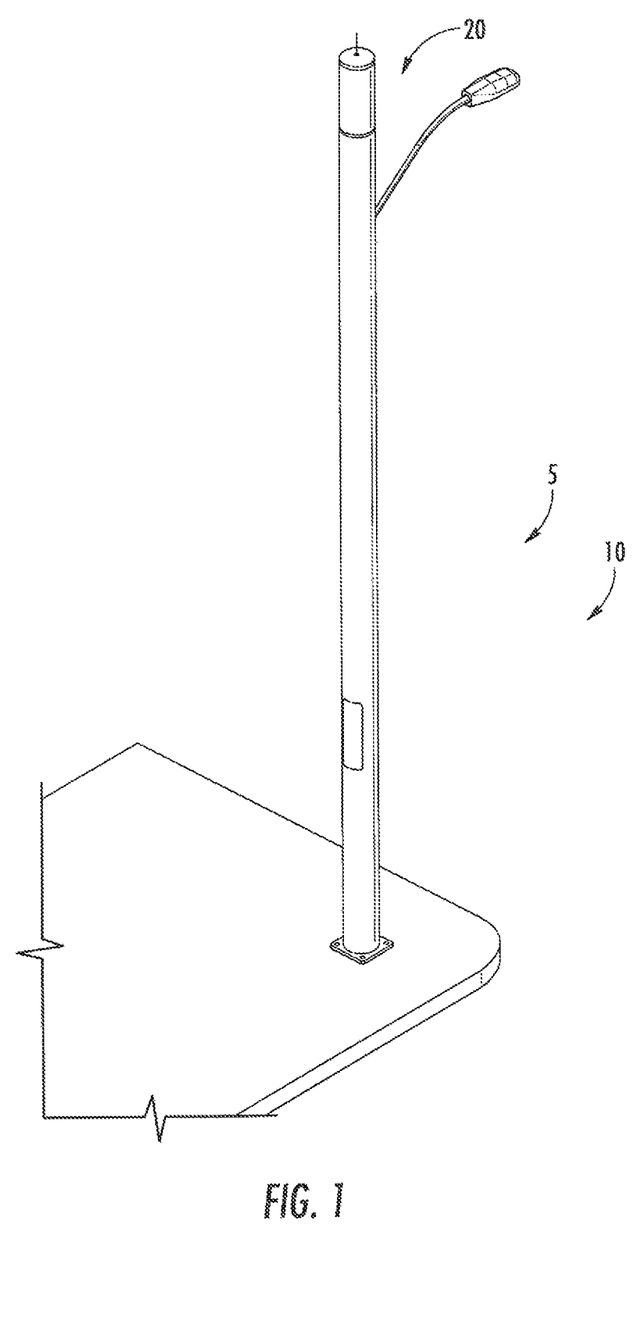
FIG. 1 is a schematic perspective view of a small cell, base station assembly including street pole and small cell antenna with an IoT Gateway assembly according to embodiments of the invention.
Figure 2:
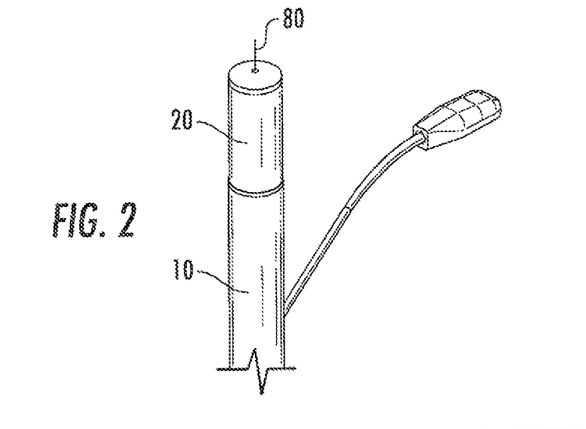
FIG. 2 is an enlarged partial perspective view of the street pole and small cell antenna of FIG. 1 showing the IoT antenna.

Referring now to FIG. 2, an IoT antenna 80 is mounted atop the small cell antenna 20. The IoT antenna 80 is connected with the IoT Gateway module 56 via a cable (not shown) that is routed through the IoT outlet 64. In some embodiments, the cable connecting the IoT antenna 80 to the assembly 50 may be routed through the small cell antenna 20, or may attach to an RF cable built into the small cell antenna 20. Other alternatives include mounting a patch antenna on the side of the pole 10 (potentially integrated into the pole 10), or to the light standard (where again it may be integrated into the light standard itself), either of which can be connected with the IoT module 56 with cables.

Referring now to FIGS. 6-9, another small cell antenna 120 and street light pole 110 are shown therein. In this embodiment, the IoT Gateway assembly 150 is mounted to the side of the pole 110 (rather than internally as shown in FIGS. 1-5). The assembly 150 includes an enclosure 152 in which are mounted an IoT Gateway module 156 and an O/E backhaul module 158, an optional WiFi module 160 and an optional edge compute CPU module 162. The assembly 150 is mounted to the pole 110 via straps or clamps 170. In this embodiment, the IoT antenna 180 is mounted on the top of the enclosure 152, as is an optional Wifi antenna 181. Optical and power connections to the assembly 150 can be achieved as discussed above. The enclosure 152 may also have fins 174 for cooling.

In the case of either of the embodiments shown above, it may be desirable to integrate the assembly 150 into a portion of the light standard in order to conceal it from view.

Figure 10:
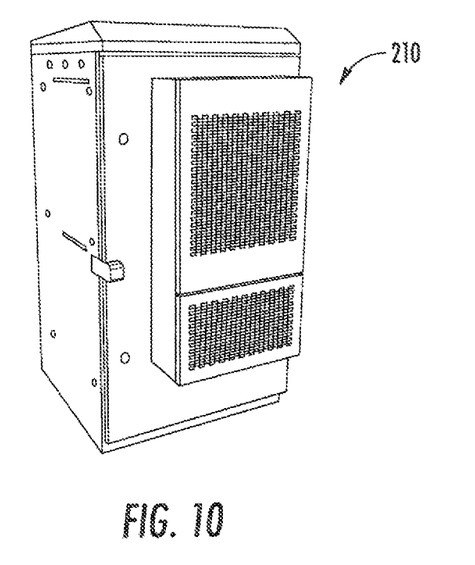
FIG. 10 is a perspective view of an electronics cabinet with an IoT Gateway assembly inside according to embodiments of the invention.
Figure 11:
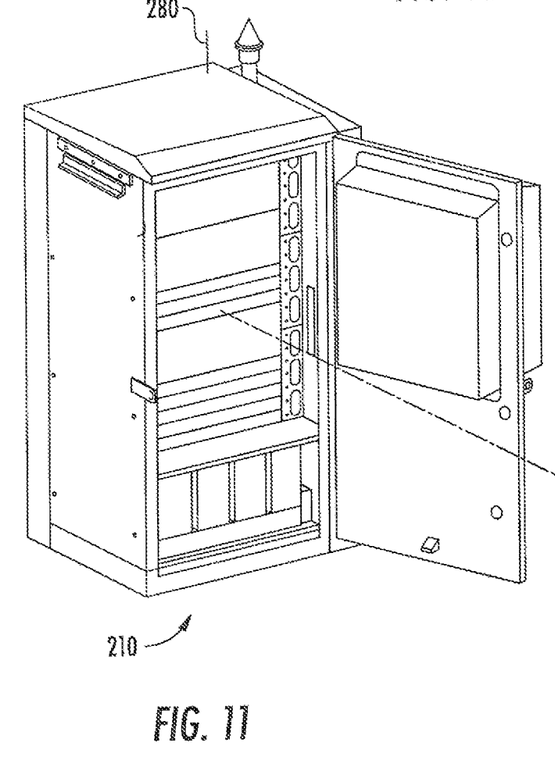
FIG. 11 is a perspective view of the electronics cabinet of FIG. 10 with the door open to show the IoT Gateway assembly.
Figure 12:
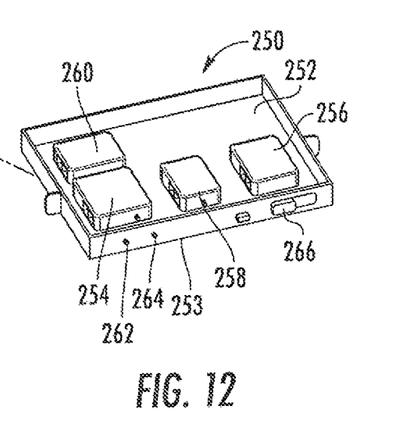
FIG. 12 is an enlarged perspective view of the IoT Gateway assembly of the cabinet of FIG. 10.

Referring now to FIGS. 10-12, an electronics cabinet, designated broadly at 210, is illustrated therein. The cabinet 210 houses a number of electronics components that are operably connected with a telecommunications antenna (typically on a tower or pole). Such components in the cabinet 210 are well known to those of skill in this art and need not be described in detail herein. An exemplary cabinet is described in U.S. patent application Ser. No. 16/149,773, filed Oct. 2, 2018, the disclosure of which is hereby incorporated herein by reference in its entirety.

As shown in FIG. 11, the cabinet 210 includes an IoT module assembly 250. A tray 252 supports an IoT Gateway module 254, an O/E backhaul converter 256, an optional WiFi module 258, and an optional MEC module 260. One side wall 253 of the tray 252 includes an IoT connection 262, a power connection 264, and optical connections 266. An IoT antenna 280 is mounted on the upper surface of the cabinet 210. A cable (not shown) can be routed from the IoT connection 262 to the IoT antenna 280 through the side of the cabinet 210 as described in U.S. Patent Publication No. 2018/0062729 to Linehan et al., filed Aug. 18, 2017, the disclosure of which is hereby incorporated herein by reference in its entirety.

As alternatives, the IoT antenna may be integrated into (a) a solar shield on the top of the cabinet 210 (which is included to reduce solar heat load on the cabinet), (b) the rear side of the cabinet (for example, into cooling baffles present on the rear of the cabinet), or (c) within a "sidecar" shield on the side of the cabinet as shown in U.S. patent application Ser. No. 16/386,614, filed Apr. 17, 2019, the disclosure of which is hereby incorporated herein by reference in its entirety. As another option, the antenna may be mounted directly to the tray or to the IoT Gateway module 254 and extend through one of the side walls of the cabinet.

Figure 13:
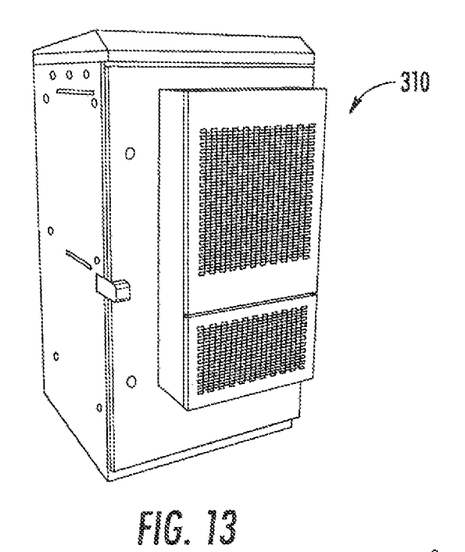
FIG. 13 is a perspective view of an electronics cabinet with an IoT Gateway assembly mounted on its exterior according to alternative embodiments of the invention.
Figure 14:
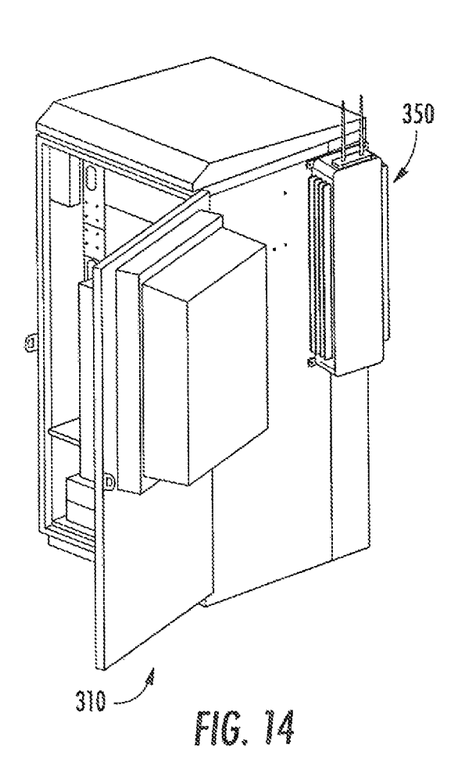
FIG. 14 is a perspective view of the electronics cabinet of FIG. 13 with the door open and showing the IoT Gateway assembly mounted on a side wall.
Figure 15:
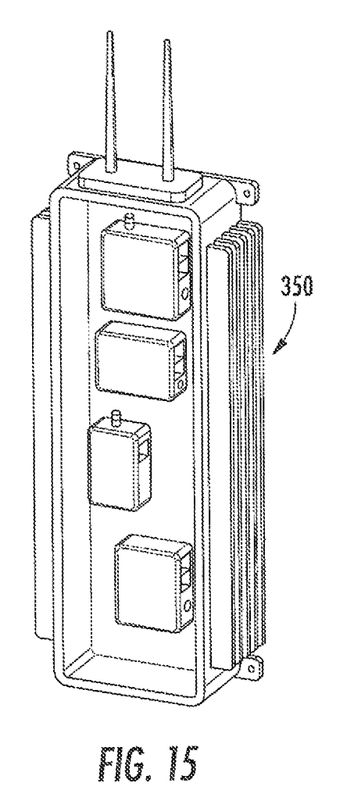
FIG. 15 is an enlarged perspective view of the IoT Gateway assembly of the cabinet of FIG. 13.

Referring now to FIGS. 13-15, a cabinet 310 is shown therein. The cabinet 310 is similar to the cabinet 210, but has an IoT Gateway assembly 350 mounted to an exterior surface of the cabinet 310, such as one of its side walls. The IoT gateway assembly 350 may be similar to the assembly 150 described above.

As alternatives to improve aesthetic appeal, the IoT Gateway assembly 350 may be hidden under a solar shield as described above, concealed by a sidecar shield, or formed to blend into the shape of the cabinet.

Figure 16:
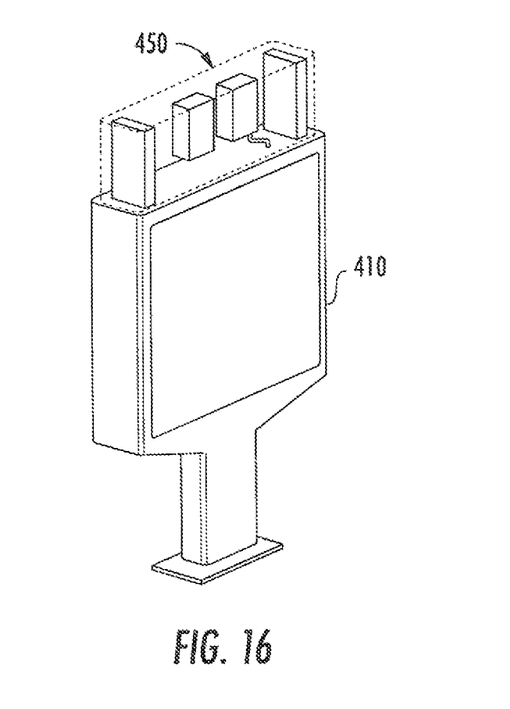
FIG. 16 is a perspective view of a kiosk with an IoT Gateway assembly according to embodiments of the invention.
Figure 17:
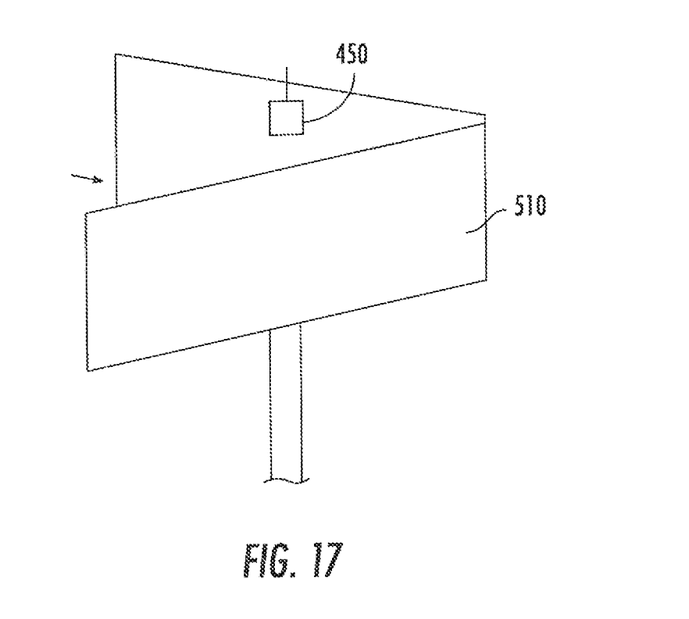
FIG. 17 is a schematic perspective view of a billboard with an IoT Gateway assembly according to embodiments of the invention.

As further alternatives, an IoT Gateway assembly 450 may be attached to the top of a display kiosk 410 (see FIG. 16) or a billboard 510 (see FIG. 17).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

That which is claimed:

1. An assembly, comprising:
   a small cell antenna base station comprising a radio, an antenna, and a monopole, wherein the antenna is mounted on an upper end portion of the monopole; and
   an Internet-of-Things (IoT) gateway assembly mounted to a lower end portion of the monopole, comprising:
   an enclosure having an IoT outlet, wherein the enclosure is mounted to an exterior surface of the street light pole;
   an IoT gateway module inserted within the enclosure, wherein the IoT gateway module is configured for aggregation and backhaul of data from IoT sensors; and
   an IoT antenna mounted atop the base station antenna and connected with the IoT gateway module via a cable routed through the base station antenna and through the IoT outlet.

2. The assembly defined in claim 1, wherein the monopole comprises a street light pole.

3. The assembly defined in claim 1, wherein the IoT gateway assembly further includes a backhaul module.

4. The assembly defined in claim 1, wherein the IoT gateway further comprises a WiFi module.

5. The assembly of claim 1, wherein the monopole comprises a display kiosk or billboard.

6. An assembly, comprising:
   a small cell antenna base station comprising a radio, an antenna, and a monopole, wherein the antenna is mounted on an upper end portion of the monopole; and
   an Internet-of-Things (IoT) gateway assembly, comprising:
   an enclosure having an IoT outlet, wherein the enclosure is inserted within a cavity in a lower end portion of the monopole;
   an IoT gateway module inserted within the enclosure, wherein the IoT gateway module is configured for aggregation and backhaul of data from IoT sensors; and
   an IoT antenna connected with the IoT gateway module, wherein the IoT antenna is mounted externally atop the antenna of the small cell base station and connected with the IoT gateway module via a cable routed through base station antenna and through the IoT outlet.

* * * * *